(12) United States Patent
Lord

(10) Patent No.: US 6,368,568 B1
(45) Date of Patent: Apr. 9, 2002

(54) METHOD FOR IMPROVING THE EFFICIENCY OF A SILICON PURIFICATION PROCESS

(76) Inventor: Stephen M Lord, 109 Peppertree La., Encinitas, CA (US) 92024

( * ) Notice: Subject to any disclaimer, the term of this patent is extended or adjusted under 35 U.S.C. 154(b) by 0 days.

(21) Appl. No.: 09/507,154

(22) Filed: Feb. 18, 2000

(51) Int. Cl.[7] .............................................. C01B 33/02
(52) U.S. Cl. ........................ 423/350; 423/342; 423/348; 423/349
(58) Field of Search ................. 423/350, 349, 423/348, 342

(56) References Cited

U.S. PATENT DOCUMENTS

| | | |
|---|---|---|
| 4,092,446 A | 5/1978 | Padovani |
| 4,213,937 A * | 7/1980 | Padovani et al. ........... 422/142 |
| 4,454,104 A | 6/1984 | Griesshammer |
| 5,374,413 A | 12/1994 | Kim |
| 5,798,137 A | 8/1998 | Lord |
| 5,810,934 A * | 9/1998 | Lord et al. .................. 118/725 |
| 5,910,295 A | 6/1999 | DeLuca |

* cited by examiner

Primary Examiner—Steven P. Griffin
Assistant Examiner—Edward M. Johnson

(57) ABSTRACT

A Method for Improving the efficiency of a silicon purification process is by controlling the temperature and composition of the effluent to a feedstock recovery composition and temperature, rapidly quenching the effluent at or near the recovery composition, separating the gases from the liquids, sending the gases to conventional hydrogen recovery and recycle facilities, separating the hydrohalosilanes from silicon tetrahalide, returning the hydrohalosilanes to the inlet of the deposition reactor, using all or some of the silicon tetrahalide to control the composition and temperature of the effluent and separately heating the hydrogen and any silicon tetrahalide returned to the decomposition reactor to a temperature greater than 400 C. and separately injecting them into the decomposition reactor.

11 Claims, 8 Drawing Sheets

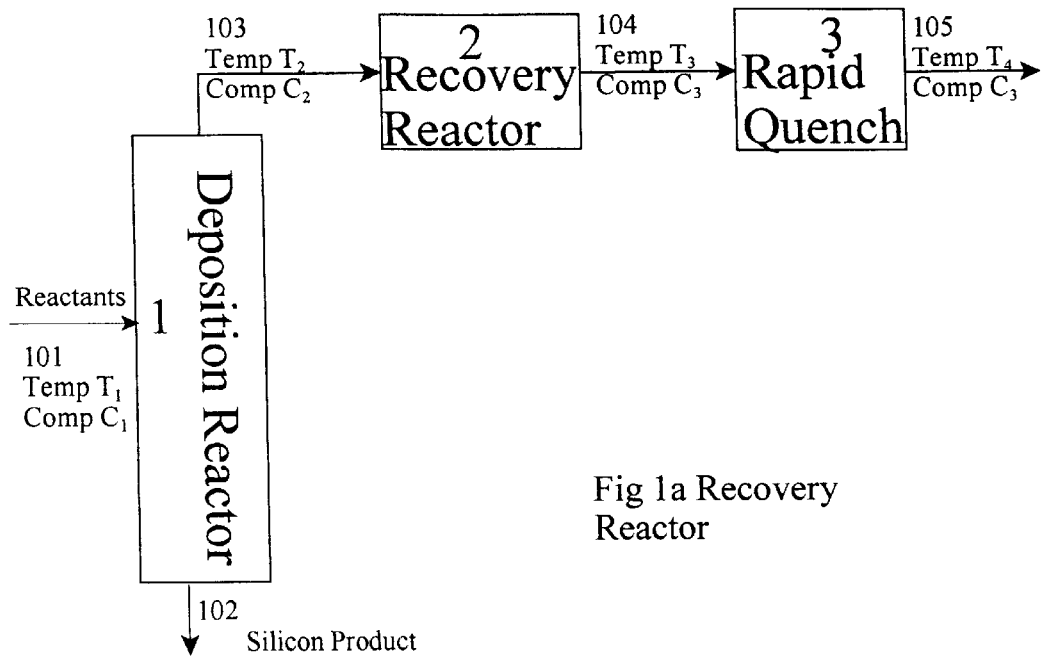
Fig 1a Recovery Reactor
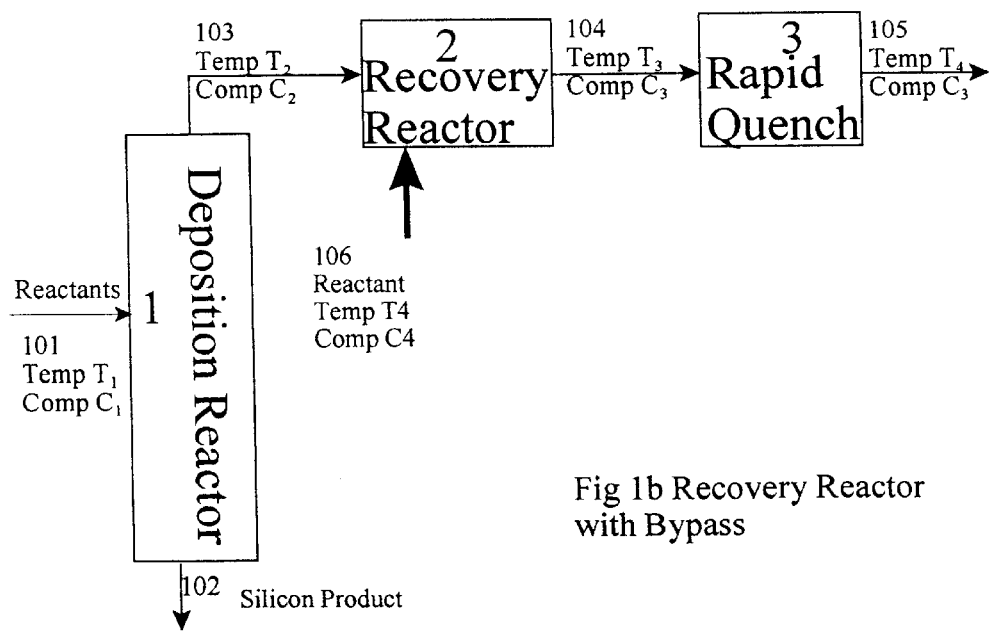
Fig 1b Recovery Reactor with Bypass

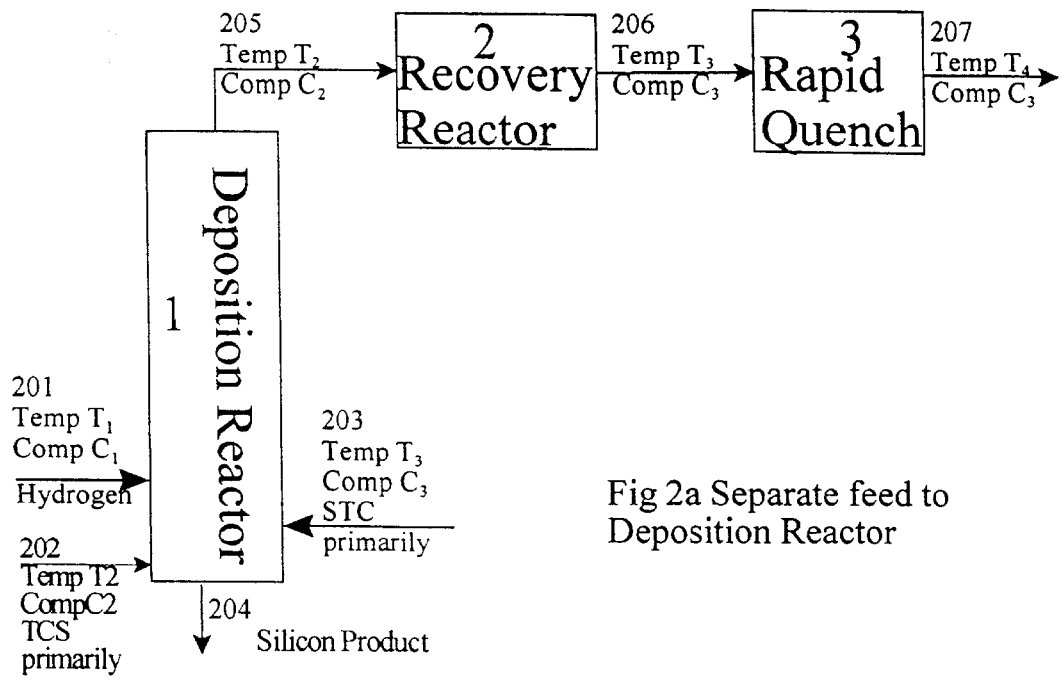
Fig 2a Separate feed to Deposition Reactor
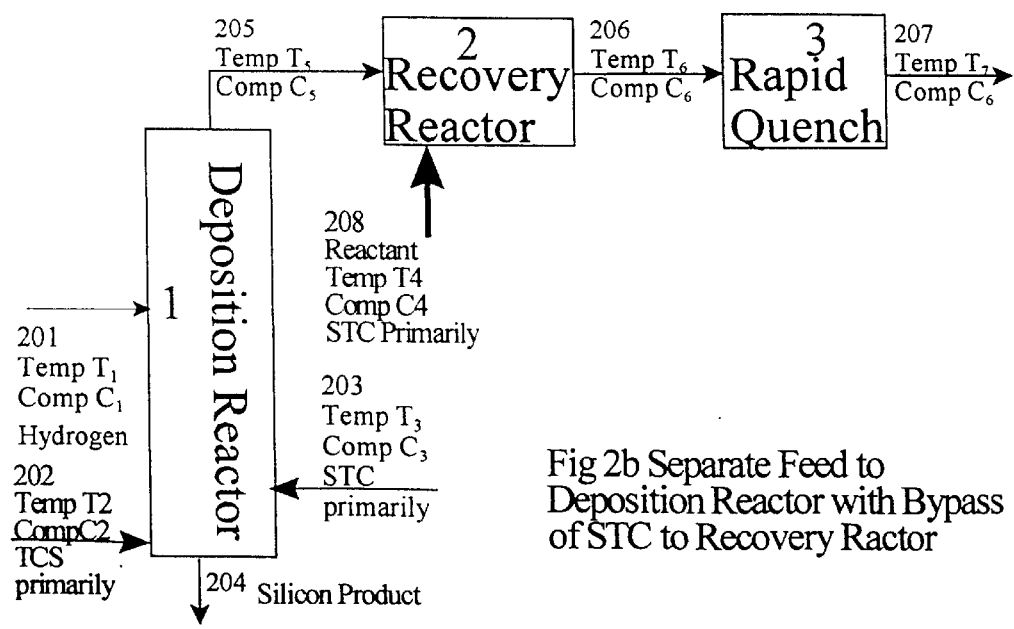
Fig 2b Separate Feed to Deposition Reactor with Bypass of STC to Recovery Ractor

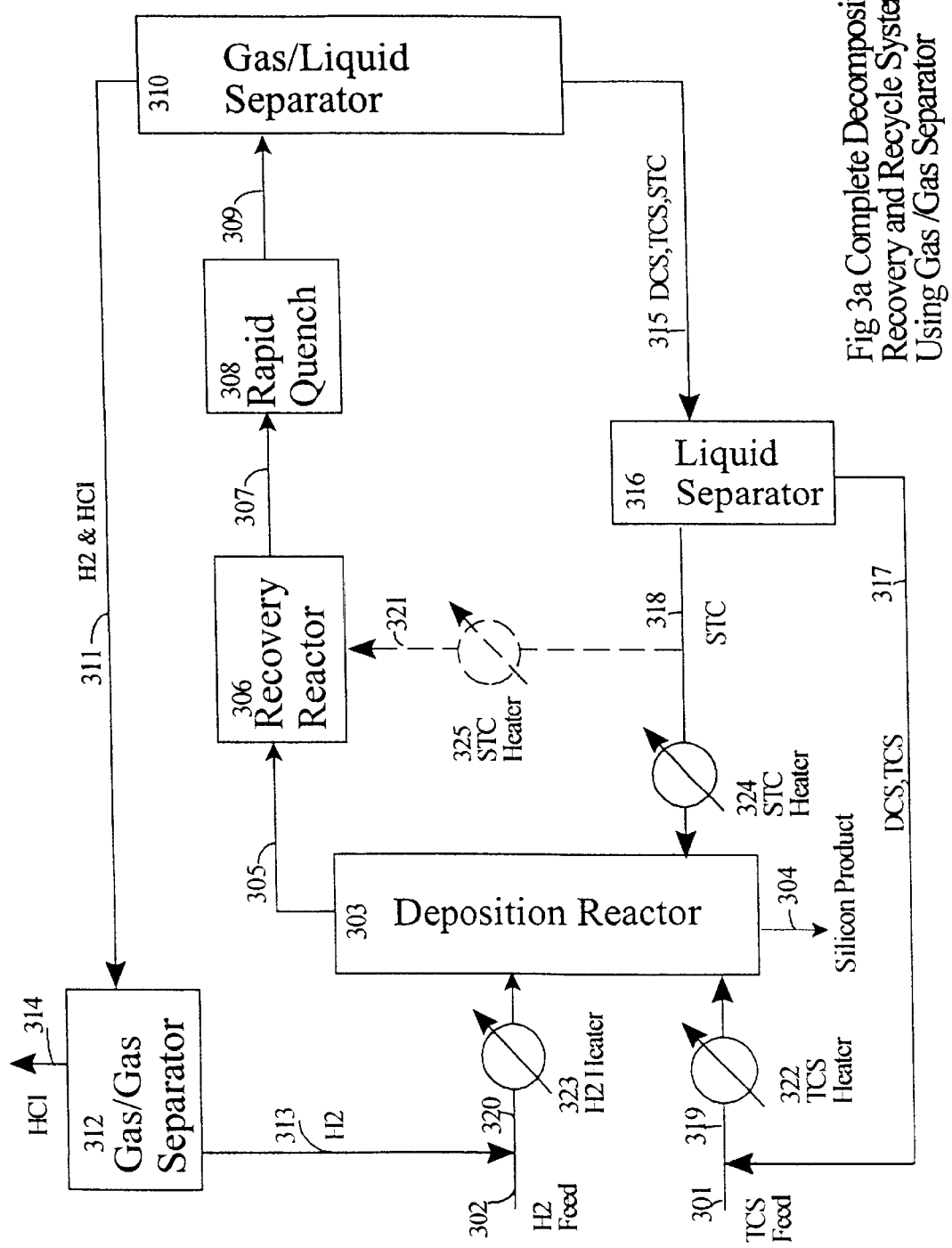
Fig 3a Complete Decomposition, Recovery and Recycle System Using Gas/Gas Separator

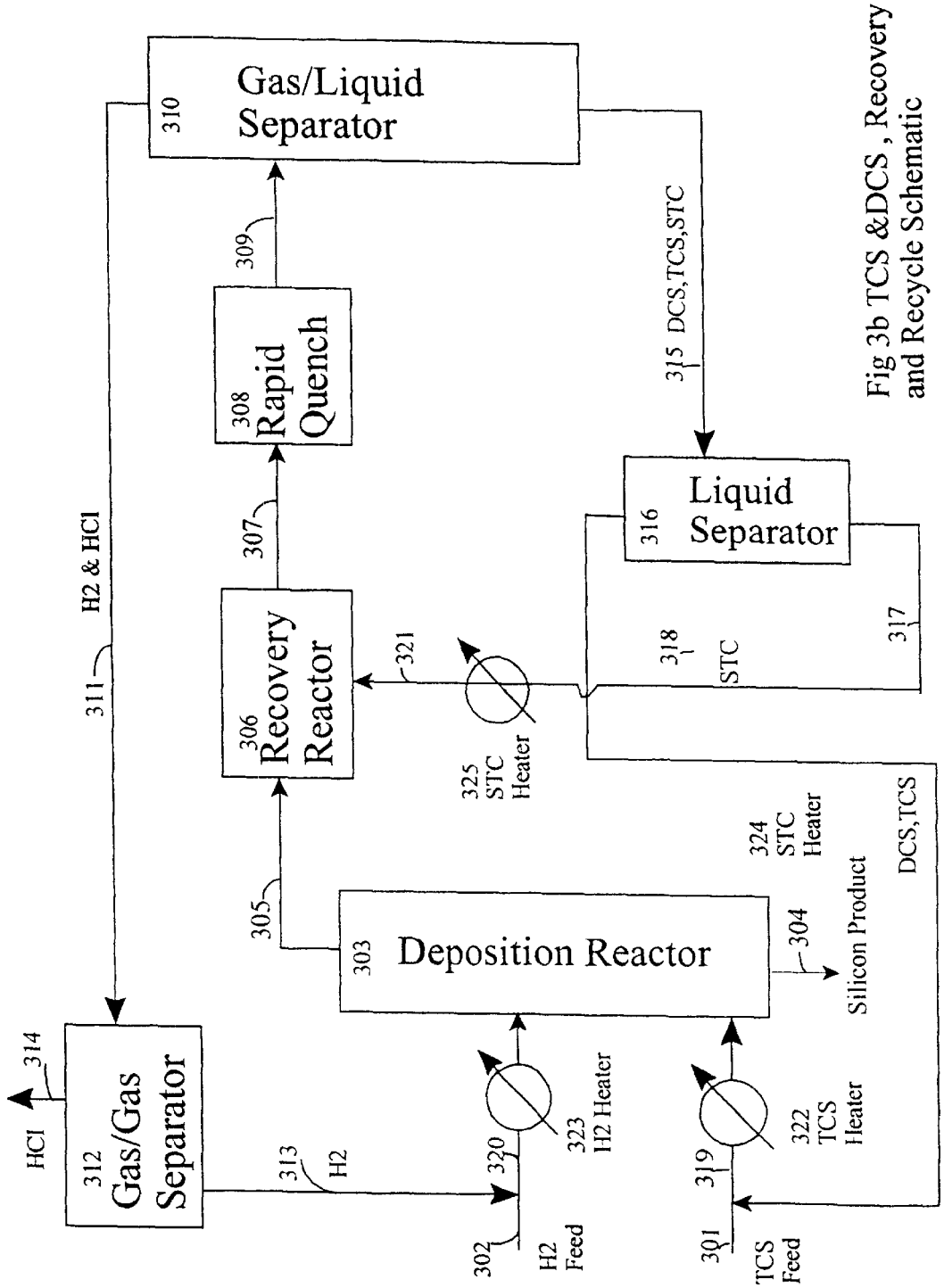
Fig 3b TCS &DCS, Recovery and Recycle Schematic

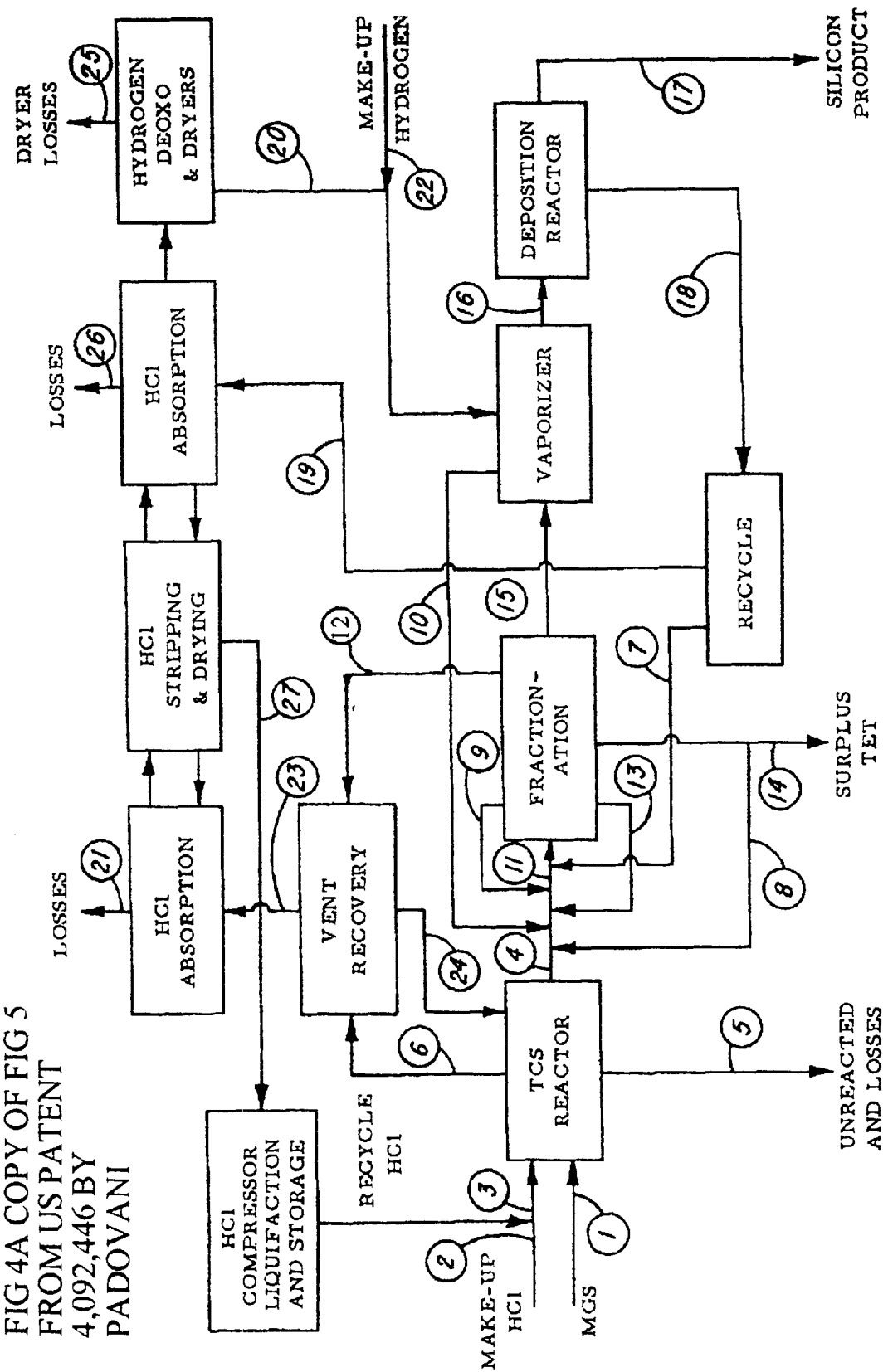

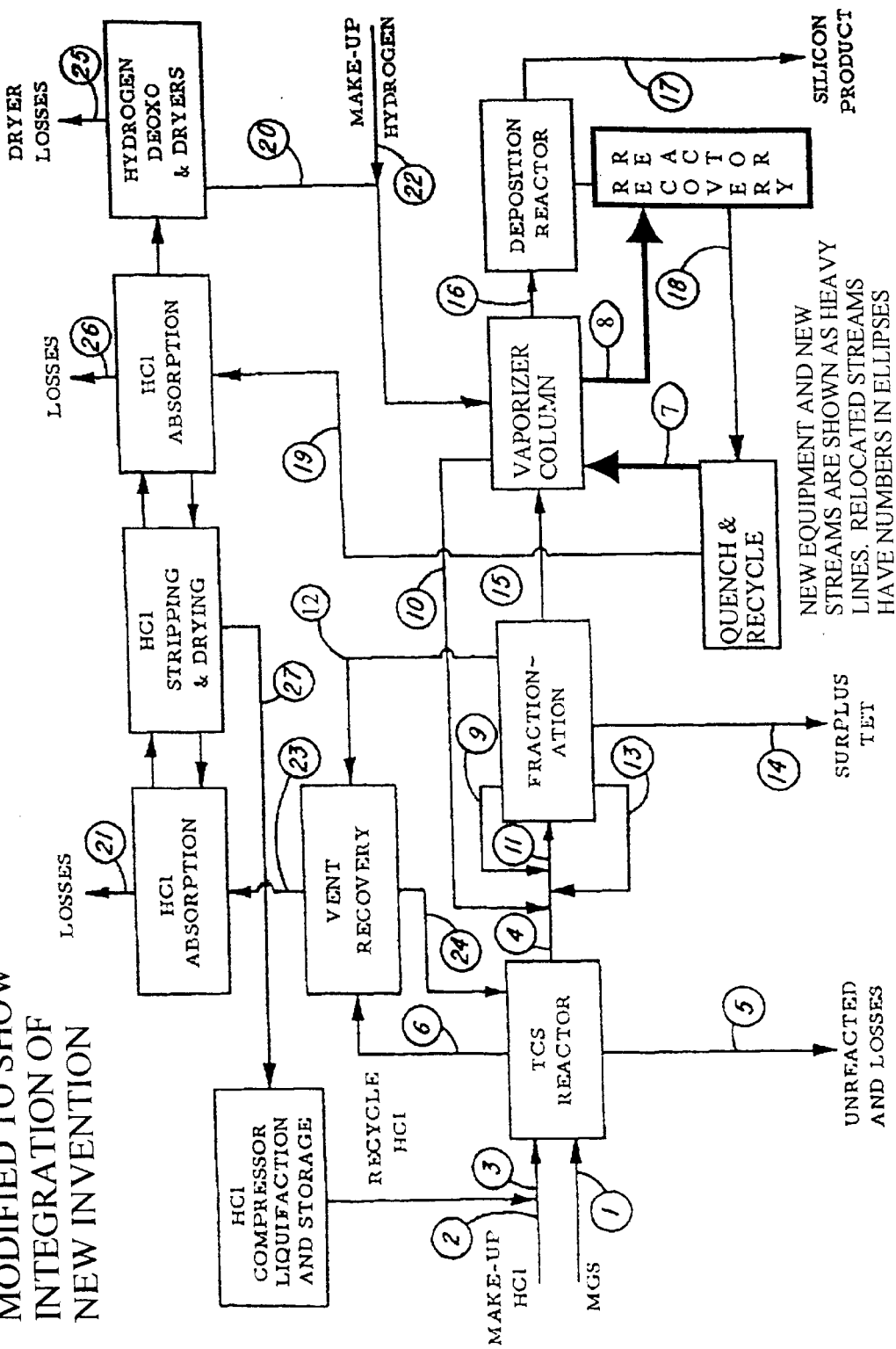

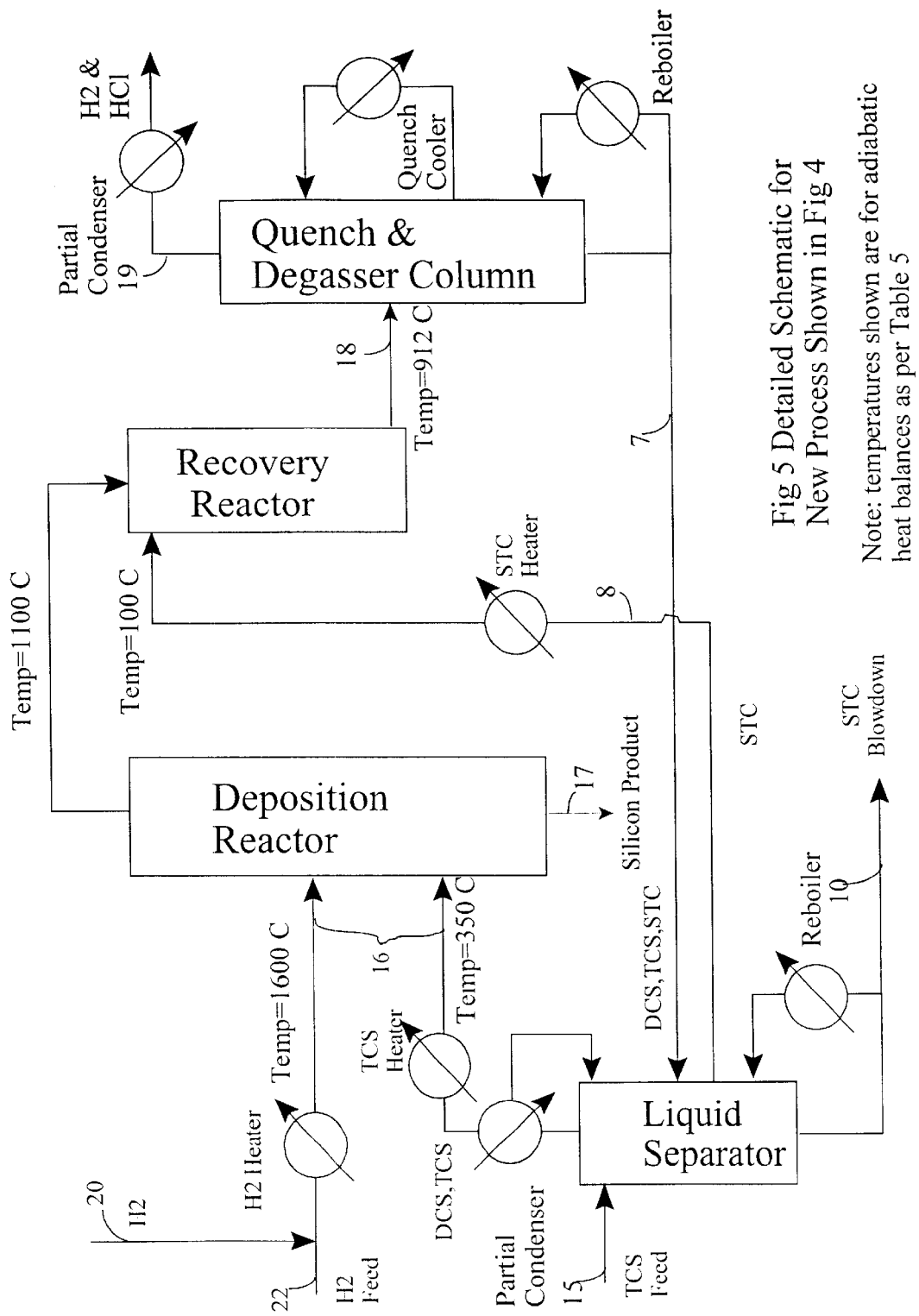
Fig 5 Detailed Schematic for New Process Shown in Fig 4
Note: temperatures shown are for adiabatic heat balances as per Table 5

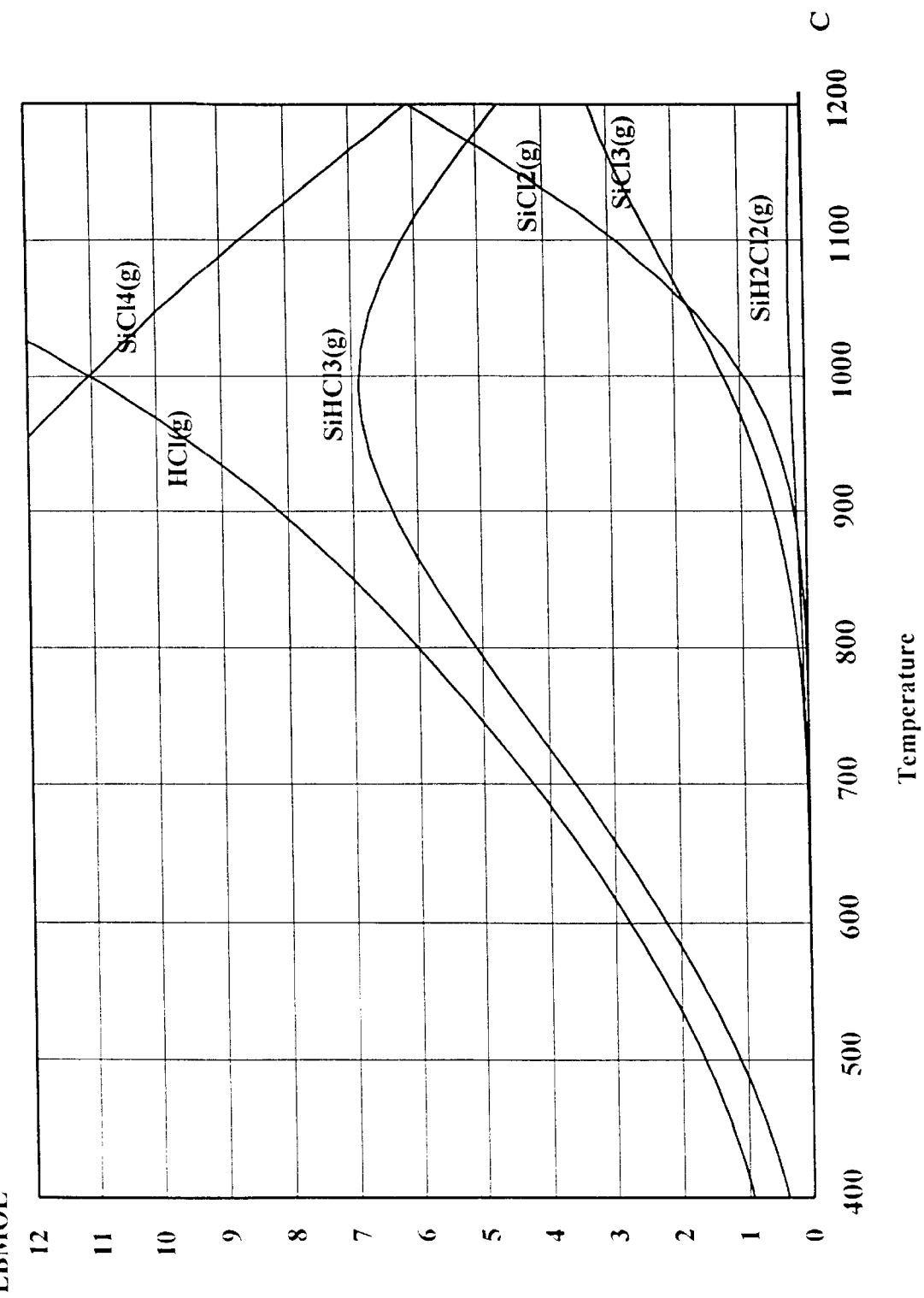
FIG 6: FEEDSTOCK RECOVERY VS TEMP FOR FIG 4

METHOD FOR IMPROVING THE EFFICIENCY OF A SILICON PURIFICATION PROCESS

BACKGROUND OF THE INVENTION

This invention relates generally to the field of silicon purification, and more particularly to a method for improving the efficiency of such a silicon purification process The production of high purity electronic grade silicon is the critical first step of the entire multi-billion dollar semiconductor industry. The basic process consists of three steps; conversion of metallurgical grade silicon into a hydrohalosilane such as trichlorosilane, purification of this material by distillation and other means, and decomposition of the material back to silicon.

There are two established ways to produce the hydrohalosilane; a low temperature (300–400 C.) low pressure (1–5 atm) high yield (90%) process using a hydrohalide, such as hydrogen chloride; and a high temperature (400–500 C.) high pressure (30–40 atm) low yield (12–24% depending on catalyst and conditions) process using silicon plus hydrogen to hydrogenate a silicon tetrahalide such as silicon tetrachloride.

The hydrohalide process was invented by Siemens and is used by the majority of the silicon producers; the hydrogenation process was invented by Union Carbide and is used in two facilities as part of their silane process.

The following equations show the desired reactions for the two processes but as noted above reaction 1 has a much higher yield $$Si+3HCl \rightarrow SiHCl_3+2H_2 \quad \text{Hydrohalide process} \qquad 1$$

$$Si+3SiCl4+2H_2 \rightarrow 4SiHCl_3 \quad \text{Silicon tetrachloride hydrogenation} \qquad 2$$

Purification is normally done by distillation, but reactive distillation is also used, as is adsorption. In most facilities there is extensive recycle and purification of hydrogen. Three facilities produce silicon hydride or silane, two from the hydrohalosilane by disproportionation (Union Carbide Process) and one from silicon tetrafluoride by reduction via aluminum hydride (Ethyl Process).

The decomposition reactors are all rod reactors except for fluid bed reactors operated on silane as part of the Ethyl Process. Fluid bed reactors have significant capital, operating and energy advantages but have proved difficult to implement. The only operating fluid bed units produce a dusty product contaminated with hydrogen that is not widely accepted.

There are two decomposition reactions for hydrohalosilanes; thermal decomposition and hydrogen reduction. (Trichlorosilane is used in the examples but bromine or iodine can be substituted for chlorine, fluorine cannot)

$$4SiHCl_3 \rightarrow Si+3SiCl4+2H2 \qquad \text{(thermal)}$$

$$SiHCl_3+2H_2 \rightarrow Si+3HCl \qquad \text{(hydrogen reduction)}$$

All halosilane reactors incorporate both and consequently produce an effluent, which has a range of silicon hydrohalides and tetrahalides and hydrogen halides and hydrogen.

The essence of the process is impure silicon in, pure silicon out plus small impurity streams. To accomplish this there are large recycle streams of hydrogen, silicon and halide containing streams and is important not to produce low value by-products or waste streams.

The key problem is the silicon tetrahalide, which is difficult to convert to silicon, and thus causes a difficult problem in closing the plant silicon and chlorine balances without large waste streams. In the preferred hydrohalide reaction process the silicon tetrahalide is also produced albeit in small quantities (4–5%). Thus there is a net production of silicon tetrahalide as a byproduct. Most plants try to minimize this byproduct production and then convert what they have to fumed silica, which is not as valuable as electronic grade silicon but enables recovery of the hydrogen halide for reuse. The Union Carbide hydrogenation of silicon tetrahalide was invented to overcome this problem but is an expensive and dangerous solution (one accident and two fatalities have been reported to date). Another approach was taken by Wacker-Chemie as is shown in the U.S. Pat. No. 4,454,104 by Griesshammer where silicon tetrachloride is reacted with hydrogen in a reactor parallel to the deposition reactor. The effluent from both reactors are then mixed and compressed to 8 bar and cooled to −60 C. in order to force the hydrogen chloride into solution and allow separation of the hydrogen. No mention is made in this patent of the benefits of controlling the temperature of the effluent or of quenching the reaction.

In a recent patent U.S. Pat. No. 5,910,295 by de Luca a closed loop process is proposed which combines the Union Carbide approach of producing silane by disproportionation with the Siemens approach of producing trichlorosilane from hydrogen chloride at high yield. The solution is to react the excess silicon tetrachloride with hydrogen and oxygen. The overall silicon production reaction is simply the thermal decomposition of trichlorosilane to silicon and silicon tetrachloride. The excess silicon tetrachloride is then oxidized with hydrogen and oxygen which chemically is the same as reacting with water.

$$4SiHCl_3 \rightarrow SiH4+3SiCl4$$

$$SiCl_4+2H_2O \rightarrow SiO_2+4HCl$$

Thus 3 moles of fumed silica are produced for every mole of silicon produced. Thus the trichlorosilane production reactors and purification processes must be four times larger than if all the silicon in the trichlorosilane were converted to silicon. The increased capacity of the above process is used to make fumed silica, which is a much less valuable product and does not require the high purification levels that the electronic grade silicon product does. Other silicon production processes make great efforts to promote the hydrogen reduction reaction because it produces more silicon from a mole of trichlorosilane.

$$SiHCl_3+2H_2 \rightarrow Si+3HCl$$

Such efforts typically include running the reactor at higher temperatures (1100 C.) than needed for thermal decomposition (850 C.) and recycling silicon tetrachloride and hydrogen to the reactor until the silicon tetrachloride is consumed. All practical plants also convert some product to fumed silica either as a means of disposing of contaminated material or as a byproduct for sale. For an overall optimum facility one would want to have the flexibility of producing the desired product slate of silicon and amorphous silica depending on market conditions. Such optima depend on the market demand and pricing for the products together with the marginal production cost and equipment capability and can be optimized using linear programming techniques, as is done in oil refining, providing the equipment has some flexibility.

There have been a number of patents for silicon deposition reactors; the key rod reactor patent is the U.S. Pat. No. 3,041,14 by Schering. U.S. Pat. No. 4,092,446 by Padovani describes an optimized system using a fluid bed and extensive recycle of materials. U.S. Pat. Nos. 5,798,137 and 5,810,934 by Lord describe a fluid bed capable of operating with or without recycle on a variety of feedstock. Various fluid bed patents describe methods of operating and of heating. U.S. Pat. No. 5,374,412 by Kim et al. describe use of two feed streams one of which is used to prevent wall deposition which would block the passage of the microwaves used for heating the beads.

All these systems take the effluent from the decomposition reactor as it is cooled down and removed from the reactor and then separate and recycle the components.

The primary deficiency in the prior technology is that it neglects the opportunities in the temperature regime between the deposition temperature which is typically between 750 and 1150 C. and the condensation temperature of the halosilanes in the effluent which are typically below room temperature. The effluent gases are allowed to cool and continue to react through this large temperature range thus producing more of the undesired silicon tetrahalide.

In this range the species in the effluent change composition with temperature and there is always an optimum temperature for recovery of the desired components which is typically 800–1000 C. At this temperature the desired hydrohalosilanes such as trichlorosilane and dichlorosilane are at or near a maximum and thus can be recovered which has great impact on the overall silicon and chlorine balance.

Thus, because of this deficiency the reactors must operate hotter and with greater hydrogen recycle to try and convert the undesired silicon tetrachloride. This in turn results in lower silicon production, more difficult materials problems and greater energy requirements.

A further deficiency is that the opportunities to change the composition of the effluent gases so as to recover more of the valuable hydrohalosilane feedstock are also neglected. The current approach of recycling a reaction byproduct (silicon tetrachloride) to the decomposition reactor results in decreased in production of that product but also results in decreased production of the desired product. The alternate approach, used by Griesshammer, of a parallel reactor reducing silicon tetrachloride with hydrogen converts a small percentage, 10%, of the silicon tetrachloride, requires heating both streams, does not promote silicon production, and significantly lowers the trichlorosilane to silicon tetrachloride ratio in the effluent. [This dilution of the feedstock is desirable for the Griesshammer patent as it improves the solubility of the hydrogen chloride but it increases the cost of the later separation.]

A further deficiency of the present processes is that the reactor does not have much flexibility in consumption of silicon tetrachloride so the byproduct silicon tetrahalide must be used to make fumed silica even if the market demand is not present.

This problem becomes more acute with the use of fluid bed reactors because they are more susceptible to materials problems as the silicon product is in physical contact with the wall, which thus must be at or close to the deposition temperature. This requires hot walls in contrast to the rod reactors, which typically have cooled walls. Furthermore fluid bed reactors do not have the internal heat generation provided by the electrical heating of the rod in rod reactors and so must add heat in some other way. If this heat is added through the walls, the walls must be hotter than the silicon product. U.S. Pat. No. 4,207,360 to Padovani described one solution to this problem, which was to use a graphite lining coated with silicon carbide. Unfortunately this material contaminated the silicon produced with carbon and thus the process failed commercially as the silicon could not sold. Lord points out that the use of silicon oxide is preferred because of its purity and cost and it has some temperature limitations. A further problem is that the materials coming into the reactor can only be preheated to a temperature below their thermal decomposition temperature which is 350–450 C. for most feedstock materials. For high throughput fluid bed reactors putting in the additional heat to bring the temperature up to the desired decomposition temperature of greater than 800 C. is very difficult. Lord suggests use of laser and/or chlorine heating in conjunction with microwaves. Heating the reactor up to the even higher temperatures needed to convert silicon tetrahalides make this problem even worse. Operating at lower temperatures (600–700 C.) as is done in U.S. Pat. No. 4,784,840 requires low deposition rates and results in dusty product contaminated with hydrogen thus requiring post treatment as described in U.S. Pat. No. 5,242,671. A further disadvantage of the prior technology is that the high temperatures used cause formation of silicon dichloride $SiCl_2$ monomer which condenses and polymerizes on the walls of the effluent piping to form explosive solids such as $Si_2Cl_6$, $Si_3Cl_8$ and $Si_4Cl_8$. One approach to resolving this problem is the injection of chlorine or hydrogen chloride in the effluent piping as suggested by Lord. The present technology encourages the reaction of such monomers to form useful products and by keeping the walls of the recovery reactor warm discourages condensation of these species. The selection of optimum recovery temperature can take into account formation of these polymers and thus it may be more optimal to select a lower temperature than would be the case otherwise in order to reduce the operational problems.

SUMMARY OF THE INVENTION

The primary object of the invention is to increase the overall efficiency of processes for the production of high purity silicon.

Another object of the invention is to recover the maximum amount of valuable feedstock.

Another object of the invention is to reduce unwanted byproducts.

A further object of the invention is to make it easier to use fluid bed reactors.

Yet another object of the invention is to simplify the retrofit of fluid bed reactors for rod reactors.

Still yet another object of the invention is to use the cheaper hydrohalide reaction for halosilane production.

Yet another further object is to improve the quality of product produced by fluid bed reactors In accordance with a preferred embodiment of the present invention, a method for improving the efficiency of a silicon purification process comprises the steps of controlling the temperature and composition of the effluent to an optimum feedstock recovery composition and temperature, rapidly quenching the effluent at or near the recovery composition, separating the gases from the liquids, sending the gases to conventional hydrogen recovery and recycle facilities, separating the hydrohalosilanes from silicon tetrahalide, returning the hydrohalosilanes to the inlet of the deposition reactor and using at least some of the silicon tetrahalide to control the composition and temperature of the effluent and separately heating and injecting the hydrogen and silicon tetrahalide feed streams to the deposition reactor to a temperature above 350 C.

In the proposed invention all or some of the silicon tetrachloride bypasses the deposition reactor to the recovery reactor while all the hydrogen goes through the deposition reactor thus improving the yield of the hydrogen reduction reaction. This results in increased yield in the deposition reactor, a reduced flow to the deposition reactor and an increased recovery of feedstock. Combining the two improvements of controlling the temperature and the composition of the effluent also results in equipment and energy savings as the added silicon tetrachloride can be used to cool the effluent and hence does not itself require to be heated to the recovery reactor temperature.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a schematic diagram illustrating the portion of the invention concerning the recovery of hydrogen and silicon containing feedstock by, in FIG. 1a, controlling the temperature then quenching to preserve the recovered feedstock and showing the preferred embodiment of controlling the temperature and composition by adding a further reactant to the recovery reactor in FIG. 1b.

FIG. 2 is a schematic diagram with FIG. 2a illustrating the portion of the invention concerning the use of three separate feed streams, each of which has different composition and consequently different temperature tolerance, to provide all or most of the needed reaction heat and FIG. 2b showing the preferred embodiment where all or some of the STC is added to the recovery reactor.

FIGS. 3a and 3b are schematic diagrams each illustrating one way in which the concepts of the invention shown in FIGS. 1 & 2 can be combined into a complete reactor system which provides significant benefits.

FIG. 4 is a comparison of the prior art flow diagram with and without the invention, FIG. 4a is a copy of a process flow diagram from a prior patent (FIG. 5 from U.S. Pat. No. 4,092,446 by Padovani) and FIG. 4b is the same system modified with the proposed invention.

FIG. 5 is a detailed schematic for the new process as implemented in FIG. 4b above with the same stream numbering system.

FIG. 6 is a graph showing the change in molecular composition with temperature in the recovery reactor after addition of the silicon tetrachloride for the flows shown in Table 1 for the stream numbers shown in the schematics FIGS. 4a & 4b.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In order to produce high purity silicon suitable for use in semi-conductor or photovoltaic applications it is necessary to form and purify a liquid or gaseous silicon containing material then decompose that material back to solid silicon. Processes to do this have been patented using materials that contain silicon and hydrogen and/or a halogen such as chlorine, bromine or iodine. Such materials include silane, trichlorosilane, dichlorosilane, silicon tetrachloride, tribromosilane etc. It is also common to include a diluent, which may partake in the reaction such as hydrogen, or be inert such as argon. The addition of an inert is usually done to add heat or improve fluidization and inerts can be added to any of the reactant streams without changing the basic process.

This particular process can be applied to all of the previously patented processes providing that the process is applied correctly so as to make recovery of a feedstock material feasible. In particular the silane decomposition process is inherently irreversible but it is possible to recover the feedstock used to make the silane by adding additional halogen containing materials. This is an optional but preferred step for the halosilane decomposition processes while it is required for decomposition processes using silane.

A more detailed description of each figure is as follows

FIGS. 1a and 1b are schematic diagrams illustrating the portion of the invention concerning the recovery of hydrogen and silicon containing feedstock. In both figures, reactants, stream 101, at a temperature T1 and composition C1 enter silicon deposition reactor, 1, where they are heated to temperature T2 and react to deposit silicon, stream 103, and effluent gases Stream 104 with composition C2 and temperature T2. The stream 104 enters the recovery reactor 2 where it is cooled to temperature T3 and reacts to reform the desired feedstock. This stream, 104, exits the recovery reactor and enters the rapid quencher, 3, where the gases are cooled rapidly to prevent decomposition of the newly reformed feedstock. The stream 105 comprises the material leaving the rapid quencher at temperature T3 that is too low for further reaction and with the desired composition C2. These stabilized gases and or liquids may then be treated for further recycle by a variety of means, examples of which are shown in FIG. 3. In FIG. 1b the preferred embodiment is shown with additional stream 106 entering the recovery reactor to control the composition. This stream can have any desired composition, including hydrogen, inerts, halosilanes and halohydrides and may consist of multiple streams mixed in the recovery reactor.

FIGS. 2a and 2b are schematic diagrams illustrating the portion of the invention concerning the use of three separate feed streams, each of which has different composition and consequently different temperature tolerance, to provide all or most of the needed reaction heat. In both figures, stream 101 has a composition C1, which is predominantly hydrogen and thus does not decompose to form silicon and thus can have any temperature T1. Stream 102 has a composition C2, which is primarily silicon tetrahalide and thus does not decompose to form silicon in the absence of hydrogen and can have any temperature T2. Stream 103 is the feedstock makeup stream and has a composition C3, which is primarily silicon hydrogen halides and thus will decompose to form silicon at temperatures above temperature T3 and hence cannot exceed this temperature. The reactor operates at a temperature T4 that is greater than T3. For an improved heat balance it is beneficial if temperatures T1 and T2 are higher than temperature T3 and preferably higher than T4. Thus the heat supplied by streams 101 and 102 can offset all or some of the heat required to maintain the reaction temperature T4 even though the feedstock stream 103 enters the reactor significantly cooler than the reactor temperature. In FIG. 2b the preferred embodiment is shown with additional stream 106 entering the recovery reactor to control the composition and this stream is preferably some or all of the silicon tetrachloride (STC) available. A portion of the available STC may be sent to the decomposition reactor for other purposes than improving the decomposition efficiency such as improving the heat balance or providing additional fluidizing gas as shown in stream 203.

FIGS. 3a and b are schematic diagrams illustrating ways in which the concepts of the invention shown in FIGS. 1 & 2 can be combined into a complete reactor system, which provides significant benefits. In both figures, the silicon feedstock stream, 301, is mixed with the recycle stream 317 to form reactor feed stream, 319, which is heated in the TCS heater and fed to the reactor at a temperature below its thermal decomposition temperature. The hydrogen feedstock stream, 302, is mixed with the recycle stream 313 to form reactor feed stream, 320, heated in the hydrogen heater and preferably fed to the reactor at a temperature above the reactor temperature. In the reactor, 303, these streams mix with some or all of recycle stream 318, which is fed to the reactor at a temperature above the reactor temperature. Thus the heat supplied by streams 320 and 318 can offset all or some of the heat required to maintain the reaction temperature T4 even though the feedstock stream 319 enters the reactor significantly cooler than the reactor temperature. The silicon product leaves the reactor as Stream 304.

The stream 305 enters the recovery reactor 306 where it is preferably combined with stream 325 (consisting of all or some of the STC stream 318), cooled and reacts to reform the desired feedstock. This stream, 307, exits the recovery reactor and enters the rapid quencher, 308, where the gases are cooled rapidly to prevent decomposition of the newly reformed feedstock. The stabilized gases, 309, exiting the quench are then cooled further in the gas-liquid separator, 310, to condense most of the silicon containing species and the condensed liquids, 311, are separated from the uncondensed gases, 310. In FIG. 3a these gases which are primarily hydrogen and hydrogen halides are further treated in a gas separator, 312, to provide a stream, 313, that is primarily hydrogen and a stream, 314, that contains most of the hydrogen halide. This gas separator can be a cryogenic device, an absorption or adsorption device, a membrane device or any combination thereof. The liquid stream, 315, is then processed in a liquid separator into a stream, 317 which is primarily silicon hydrogen halides and a stream, 318, which is substantially free of silicon hydrogen halides. Such a separator will typically be a distillation column but any techniques are suitable which will provide good separation. The required degree of removal of hydrohalosilanes, such as dichlorosilane or trichlorosilane from the tetrahalide stream depends on whether the tetrahalide stream will be heated to such a temperature where silicon might form. In the preferred embodiment this entire stream is sent to the recovery reactor at low temperature thus some contamination with hydrohalosilanes is not an operational problem but only an economic problem. If some of this stream is to be heated above the thermal decomposition temperature of the hydrohalosilanes then there must be insufficient hydrohalosilanes in the stream to cause operational problems due to the formation of silicon by thermal decomposition. FIG. 3b represents an alternative approach where gas exiting the top of 310 is primarily hydrogen and the hydrogen chloride is dissolved in the liquid chlorosilanes and is then removed in a further gas liquid separator. Preferably both gas/liquid separators are distillation columns and the benefits and Griesshammer describes requirements of this approach in U.S. Pat. No. 4,454,104, incorporated herein by reference.

FIG. 4 shows how this system may be beneficially integrated into an overall silicon purification facility. There are many ways of obtaining such an overall system but the basic principles of production, purification, deposition and recycle must be followed. For the purposes of comparison to prior technology, FIG. 4 is based on FIG. 5 from Padovani as shown in the original form in FIG. 4a. In FIG. 4b the recycle stream 7 is rerouted to the vaporizer, a quench unit is added between the deposition reactor and the recycle unit and stream 8 is changed to a stream which comes from the vaporizer directly to the quench unit. The quench unit consists of the recovery reactor and quench/degasser column described in FIG. 6 which is based on the concepts of FIGS. 1, 2 & 3. The vaporizer is changed to a distillation column capable of separating out the blowdown stream 10 and recycle stream 8 as silicon halide streams with only small, (0.1%), amounts of silicon hydrogen halides. For ease in comparison the hydrogen streams are shown combined with the silicon halide stream in stream 16. Preferentially the hydrogen streams 20 and 22 would enter the reactor separately at a temperature higher than the reaction temperature as shown in FIG. 6.

FIG. 4a is described in detail in Padovani, incorporated herein by reference, and the Figure is taken directly from Padovani with the same numbering system. In Padovani there is no attempt to control conditions so as to recover feedstock, maintain the purity of the effluent, provide for more than one stream to the reactor or bypass the reactor with a silicon halide stream.

FIG. 5 shows the details of how the new process is implemented in FIG. 4b to provide the mass balance shown in Table 1 under improved process and the heat balance at the entry to the deposition and recovery reactors as shown in Tables 2 and 3, respectively.

The stream numbers are the same as in FIG. 4. The hydrogen streams 20 and 22 are combined then heated in hydrogen heater, 1, to a temperature between 1300–1600 C. before entering the deposition reactor through an inlet separate from that used for the remainder of the reacting flows which are heated to a temperature of 350 C. The two components of stream 16 do not meet until inside the reactor to avoid premature decomposition of the silicon containing materials. The resulting heat balances are shown in Table 2. Heating the hydrogen to 1300 C. results in a temperature of 845 C. inside the reactor, heating to 1600 C. results in a temperature of 1102 C. in the reactor under adiabatic conditions. In section B of Table 2 the heat required to raise the reactor temperature to 1100 C. is calculated as 272 Kilowatts for 50% efficient heaters. It is clear to one knowledgeable in the art that many combinations of hot hydrogen temperature and flowrate may be combined with heater input to obtain the desired operating temperature conditions in the reactor. The silicon is deposited and removed as stream 17. The effluent gases leave the reactor at the reactor temperature of 1100 C. and enter the recovery reactor, where they mix with the recycled Silicon tetrachloride stream, 8, and react and cool to the chosen recovery temperature (shown as 912 C.). Table 3 shows the heat balance for this reactor and shows that the cooling gas stream, 8 should be at 100 C. for adiabatic heat balance. Again variations on this approach are feasible, the effluent gas could be allowed to cool to 1050 C. and the cooling gas would then have to be heated to a higher temperature. The effluent from the recovery reactor is stream 18 and it enters the quench column where it is rapidly cooled to prevent further reaction. This column is shown with a pumparound cooler in the center which provides the rapid quenching, a reboiler at the bottom which serves to provide some gas stripping for hydrogen and hydrogen bromide removal and a quench condenser at the top to recover as much silicon containing feedstock as possible. Packing or trays are provided in the column to improve the heat and mass transfer. The recovered and degassed feedstock, 7, is then fed to the vaporizer column, where it is separated into a primarily silicon tetrachloride stream, 8, a blowdown stream, 10, which removes impurities and an overhead stream consisting of primarily hydrogenated silicon containing feedstock. Stream 8 is removed as vapor and is heated in STC heater 11 to the desired temperature (100 C. in this example). Additional liquid feedstock makeup is fed to the column near the top via stream 15 from the purification facility; this cold stream provides reflux for the column to aid in the separation. A reflux or knock back partial condenser provides additional reflux. The gas leaving this condenser is superheated to 350 C. in the TCS heater then fed to the deposition reactor.

FIG. 6 shows the feedstock recovery vs. temperature for the conditions used in Table 1 for the recovery reactor. It can be seen that as the temperature drops from the deposition temperature of 1100 C. then the $SiCl_4$ and $SiHCl_3$ increase but the $SiHCL_3$ reaches a peak at 1000 C. and starts to decline. The very reactive silicon halides $SiCl_2$ and $SiCl_3$ both decline as the temperature drops and by 900 C. the silicon dihalide concentration is very low. These materials can form explosive polymeric solids which are a difficult safety and operational problem thus the optimal recovery temperature of 912 C. and composition used in this example and shown in TABLE 1 is less than the peak trichlorosilane temperature and composition for safety reasons. The silicon dichloride concentration is the most important because it is a polymeric chain former unlike silicon trichloride which is a chain terminator.

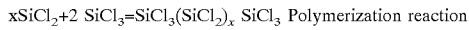

$xSiCl_2 + 2\ SiCl_3 = SiCl_3(SiCl_2)_x\ SiCl_3$ Polymerization reaction

Thus as the ratio of $SICl_2$ to $SiCl_3$ decreases the chain length decreases and the materials formed are of lower molecular weight, less prone to condense out ($Si_2Cl_6$ has MP of –33 C.) and safer to handle. Hexachlorodisilane, $Si_2Cl_6$, is also a valuable product in its own right as a precursor to substituted disilanes.

FIGS. 4, 5 and 6 and associated tables are developed to illustrate the use of this design for a fluid bed reactor similar to that used by Padovani. Such reactors are not yet in widespread use and most silicon is currently produced by rod reactors, which maintain a large temperature difference inside the reactor to ensure most of the silicon is deposited on the hot rod. Such reactors can also be used but the hydrogen and TCS would be heated to much lower temperatures prior to the inlet and the effluent gas would be at a lower temperature. The same approach may still be followed but stream 8 would be heated to a much higher temperature and the effluent from the reactor would also be heated in order to obtain the same temperature of about 900 C. in the recovery reactor.

Table 1 shows a comparison of the mass balances for FIG. 4 and FIG. 5. As much as possible the streams have been kept close to the original in composition and flow except where the improvements of the present system require a change.

To ease comparison the original molar flows have been divided by the molar flows in the new mass balance. Molar flows are used instead of mass flows because the molar flow more accurately represents the volumetric flow and energy requirements which determines the sizing of the equipment and the required energy. The scaled cost of the equipment depends on the ratio of the size of the equipment to the power of 0.65. Thus the scaled cost ratio shown in the table reflects the effect on the cost of changing the size.

The first six streams, 1, 2, 3, 4, 5 and 6 which relate to the TCS production reactor all have a molar flow ratio close to one thus there is little impact on this unit. Stream 7 is 20% greater in the improved version but this stream is redirected to the vaporizer. The key improvement is Stream 11, the feed to the fractionation, which is reduced from 3070 lb./hr to 614 lb./hr. This is reflected in a 20.6% molar flow ratio and a 36% scaled cost. This is a major system which consists of a silicon tetrachloride splitter column, a trichlorosilane column, a silicon tetrachloride adsorber, two silicon tetrachloride columns and associated feed and product tanks, pumps, reboilers condensers etc. Thus five major pieces of equipment are reduced in size by a factor of five which translates to a scaled cost which is only 36% of the original. An additional recovery reactor is provided and the quench unit and distillation column replace the recycle unit and vaporizer. The feed stream to the deposition reactor is 70% of the original flow which results in a 30% energy saving and a scaled cost of 80% for this critical equipment. Coincident with the reduction in cost is a 9% increase in production as shown in stream 16. The feed stream, 18, to the recycle equipment/quench is 78% of the original stream thus a reduction in size compensates for an increase in complexity. The feed to the Vaporizer/distillation equipment is the sum of two streams 7 and 15 in FIG. 4 compared to only 15 in FIG. 5. Thus the feed is 23.37 lbmol/hr compared to 16.74 lbmol/hr for an increase of 40% and a scaled cost factor of 1.24. The equipment is thus larger and more complex since it is a distillation column but only one column is required compared to two vaporizers. Energy requirements are even higher because the requirement for reflux means there is additional heat provided to the reboiler but the temperature is low so low cost energy such as waste heat can be used and the energy can be used efficiently. In contrast the reduction in energy for the reactors is a reduction in high temperature energy which is more difficult to provide, more expensive and less efficient. In U.S. Pat. No. 5,374,413 the silicon deposition reactor is heated by microwaves which is an expensive heating mechanism and difficult to implement because wall deposits block the microwaves. In U.S. Pat. No. 5,798,137 lasers are used for the critical heating in the initial entry or jet region and this is an even more expensive mechanism and much less efficient. Therefore substitution of low-grade heat for expensive reactor heat is a beneficial advantage of this method.

In summary the invention provides overall system improvements comprising a fivefold reduction in throughput of the major fractionation train, a 30% reduction in throughput of the deposition reactors and a 9% improvement in silicon production for the cost of a recovery reactor and some increase in cost of the recycle unit and vaporizer. It also provides a method to supplement or replace the reactor heat needed for the decomposition reactor which heat is known to be difficult and expensive to provide for fluid bed decomposition reactors which are established as the desired low cost alternative to rod reactors but which have proved very difficult to implement.

This invention is particularly beneficial for increasing the throughput of an existing facility as the same distillation train can process the output of five reactors. Additional equipment is required for deposition and recycle but the production can be increased to 5.5 times the original output.

The required throughput to the deposition reactors is only 70% of the original thus the reactor is capable of 40% more throughput hence only three more reactors of the same size are required to increase the throughput to 5.5 times the original.

In the present form of the invention three separate innovations; recovering silicon feedstock by control of recovery temperature and composition then quenching; feeding separate streams to a decomposition reactor and bypassing the reactor with some or all of the silicon tetrahalide stream directly to feedstock recovery to control the temperature and composition are connected to standard steps in such a manner that the combination provides an overall optimization of silicon deposition, energy efficiency, product quality and ease of operation.

In the best embodiment of this system, the deposition reactor is an energy efficient fluidized bed and the effluent handling and separation system is composed of high purity materials such that no additional purification is needed of the silicon containing materials or hydrogen.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

TABLE 1a

Copy of Table 1 from US Pat. No. 4,092,446 modified to add molar flows

Stream number

| Stream Identification Components | MW | 1 MGS lbs/hr | 2 Makeup HCl lbs/hr | 3 HCl Feed lbs/hr | 4 Crude TC Product lbs/hr | 5 TCS Unit Losses lbs/hr | 6 TCS Unit Off gas lbs/hr | 7 Recycle Halides lbs/hr | 8 TET Botto Recycle lbs/hr | 9 TET OH lbs/hr | 10 Vap BD lbs/hr | 11 Feed to Fract lbs/hr | 12 Column Vents lbs/hr | 13 TCS OH lbs/hr |
|---|---|---|---|---|---|---|---|---|---|---|---|---|---|---|
| Hydrogen | 2.016 | | | | | | 6.47 | 0.16 | | | | | | |
| Silicon | 28.06 | 86.05 | | | | 8.61 | 20.34 | | | | | | | |
| Hydrogen Chloride | 36.461 | | 50.03 | 338.96 | | | | 46 | | | | 46.18 | 46 | 0.18 |
| Dichlorosilane | 100.982 | | | | | | | 31.58 | | | | 39.47 | 31.58 | 7.89 |
| Trichlorosilane | 135.4 | | | | 480.78 | | 12.15 | 795.52 | 135.4 | 10.36 | 62.24 | 1374.17 | 93.68 | 25.27 |
| Silicon Tetrachloride | 169.87 | | | | 28.88 | | 1.7 | 1217.89 | | 163.87 | 64.12 | 1610.16 | | |
| Total | | 86.05 | 50.03 | 338.96 | 509.66 | 8.61 | 40.66 | 2091.15 | 135.4 | 174.23 | 126.36 | 3070.14 | 171.42 | 33.34 |

| Components | MW | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr |
|---|---|---|---|---|---|---|---|---|---|---|---|---|---|---|
| Hydrogen | 2.016 | 0 | 0 | 0 | 0 | 0 | 3.209325 | 0.079365 | 0 | 0 | 0 | 0.079365 | 0.079365 | 0 |
| Silicon | 28.06 | 3.066643 | 0 | 0 | 0 | 0.306842 | 0 | 0 | 0 | 0 | 0 | 0 | 0 | 0 |
| Hydrogen Chloride | 36.461 | 0 | 1.372151 | 9.296509 | 0 | 0 | 0.557856 | 1.261622 | 0 | 0 | 0 | 1.261622 | 1.261622 | 0.004937 |
| Dichlorosilane | 100.982 | 0 | 0 | 0 | 0 | 0 | 0.120318 | 0.312729 | 0 | 0 | 0 | 0.390862 | 0.312729 | 0.078133 |
| Trichlorosilane | 135.4 | 0 | 0 | 0 | 3.550812 | 0 | 0.089734 | 5.875332 | 0.79708 | 0.076514 | 0.459675 | 10.14897 | 0.691876 | 0.186632 |
| Silicon Tetrachloride | 169.87 | 0 | 0 | 0 | 0.170012 | 0 | 0.010008 | 7.169541 | 0 | 0.964679 | 0.377465 | 9.478778 | 0 | 0 |
| Total | | 3.066643 | 1.372151 | 9.296509 | 3.720825 | 0.306842 | 3.987242 | 14.69859 | 0.79708 | 1.041193 | 0.83714 | 21.36453 | 2.345592 | 0.269702 |

Stream number

| Stream Identification Components | 14 Surplus TET lbs/hr | 15 Vap Feed lbs/hr | 16 Feed to Reactors lbs/hr | 17 Silicon Product lbs/hr | 18 Reactor Effluent lbs/hr | 19 Recycle Gas lbs/hr | 20 H2 Recycle lbs/hr | 21 Losses lbs/hr | 22 Make-up Hydrogen lbs/hr | 23 Vent gase to HCl sys lbs/hr | 24 Vent Reco Liquid lbs/hr | 25 H2 Dryer Losses lbs/hr | 26 Losses lbs/hr | 27 Recycle HCl lbs/hr |
|---|---|---|---|---|---|---|---|---|---|---|---|---|---|---|
| Hydrogen | | | | | 286.7 | 286.54 | 281.48 | 6.63 | 10.22 | 6.63 | | 3.63 | 1.43 | |
| Silicon | | | | 69.6 | | | | | | | | | | |
| Hydrogen Chloride | | | 291.7 | | 283.8 | 237.8 | | 3.31 | | 66.34 | | | 11.9 | 288.93 |

TABLE 1a-continued

Copy of Table 1 from US Pat. No. 4,092,446 modified to add molar flows

| Components | MW | | | | | | | | | | | | | | |
|---|---|---|---|---|---|---|---|---|---|---|---|---|---|---|---|
| Dichlorosilane | 100.982 | | | | | | | 3.02 | | | | 28.56 | | | |
| Trichlorosilane | 135.4 | 1244.74 | 1182.5 | | 801.2 | | | 1.59 | | | 104.24 | | | 1.32 | |
| Silicon Tetrachloride | 169.87 | 28.47 | 1282.4 | | 1218.3 | | | 0.01 | | | 1.69 | | | 5.68 | 0.41 |
| Total | | 28.47 | 2527.14 | 2692.5 | 69.6 | 2622.9 | 531.75 | 281.48 | 14.56 | 10.22 | 77.59 | 134.49 | 3.63 | 20.74 | 288.93 |
| Components | MW | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr |
| Hydrogen | 2.016 | 0 | 0 | 144.6925 | 0 | 142.2123 | 142.1329 | 139.623 | 3.28869 | 5.069444 | 3.28869 | 0 | 1.800595 | 0.709325 | 0 |
| Silicon | 28.06 | 0 | 2.480399 | 0 | 2.480399 | 0 | 0 | 0 | 0 | 0 | 0 | 0 | 0 | 0 | 0 |
| Hydrogen Chloride | 36.461 | 0 | 0 | 0 | 0 | 7.783659 | 6.522037 | 0 | 0.090782 | 0 | 1.819478 | 0 | 0 | 0.326376 | 0 |
| Dichlorosilane | 100.982 | 0 | 0 | 0 | 0 | 0.325801 | 0.013072 | 0 | 0.029906 | 0 | 0.029906 | 0.282823 | 0 | 0.013072 | 0 |
| Trichlorosilane | 135.4 | 0 | 9.193058 | 8.733383 | 0 | 5.917282 | 0.04195 | 0 | 0.011743 | 0 | 0.011743 | 0.769867 | 0 | 0.04195 | 7.924358 |
| Silicon Tetrachloride | 169.87 | 0.167599 | 7.549302 | 7.171955 | 0 | 7.171955 | 0.002414 | 0 | 5.89E−05 | 0 | 5.89E−05 | 0.009949 | 0 | 0.002414 | 0 |
| Total | | 0.167599 | 16.74236 | 160.5978 | 2.480399 | 163.411 | 148.7124 | 139.623 | 3.421181 | 5.069444 | 5.149877 | 1.062639 | 1.800595 | 1.093137 | 7.924358 |

TABLE 1b

Improved Mass Balance based on FIG 4b

| Stream Identification Components | MW | 1 MGS lbs/hr | 2 Makeup HCl lbs/hr | 3 HCl Feed lbs/hr | 4 Crude TC Product lbs/hr | 5 TCS Unit Losses lbs/hr | 6 TCS Unit Off gas lbs/hr | 7 Recycle Halides lbs/hr | 8 TET To Quench lbs/hr | 9 TET OH lbs/hr | 10 Vap BD lbs/hr | 11 Feed to Fract lbs/hr | 12 Column Vents lbs/hr | 13 TCS OH lbs/hr |
|---|---|---|---|---|---|---|---|---|---|---|---|---|---|---|
| Hydrogen | 2.016 | | | | | | 6.571664 | 0.112508 | | | | | | 0 |
| Silicon | 28.06 | 8.26E+01 | | | | 8.2565 | 20.34 | 0 | | | | | | 0 |
| Hydrogen Chloride | 36.461 | | 46.40906 | 406.6335 | | | | 1.553239 | | | | | | 0 |
| Dichlorosilane | 100.982 | | | | | | 12.15 | 16.4696 | | | | | 35.4882802 | |
| Trichlorosilane | 135.4 | | | | 507.0494 | | 1.7 | 880.9264 | 1.71958 | 3.924622 | 0.022341 | 520.5693 | | 9.5728954 |
| Silicon Tetrachloride | 169.87 | | | | 28.40728 | | | 2173.801 | 2157.349 | 9.570127 | 56.0571 | 94.03451 | | |
| Total | | 82.565 | 46.40906 | 406.6335 | 535.4567 | 8.2565 | 40.76166 | 3072.863 | 2159.069 | 13.49475 | 56.07944 | 614.6038 | 35.4882802 | 9.5728954 |

| Components | MW | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr |
|---|---|---|---|---|---|---|---|---|---|---|---|---|---|---|
| Hydrogen | 2.016 | 0 | 0 | 0 | 0 | 0 | 3.259754 | 0.055807 | 0 | 0 | 0 | 0 | 0 | 0 |
| Silicon | 28.06 | 2.94E+00 | 0 | 0 | 2.94E-01 | 2.94E-01 | 0 | 0 | 0 | 0 | 0 | 0 | 0 | 0 |
| Hydrogen Chloride | 36.461 | 0 | 1.272841 | 11.15256 | 0 | 0 | 0.557856 | 0.0426 | 0 | 0 | 0 | 0 | 0 | 0 |
| Dichlorosilane | 100.982 | 0 | 0 | 0 | 0 | 0 | 0.120318 | 0.163094 | 0 | 0 | 0 | 0 | 0.26209956 | 0 |
| Trichlorosilane | 135.4 | 0 | 0 | 0 | 3.744826 | 0 | 0.089734 | 6.506103 | 0.0127 | 0.028985 | 0.000165 | 3.844677 | 0 | 0.07070085 |
| Silicon Tetrachloride | 169.87 | 0 | 0 | 0 | 0.16723 | 0 | 0.010008 | 12.79685 | 12.7 | 0.056338 | 0.33 | 0.553567 | 0 | 0 |
| Total Molal Flow Ratio | | 2.942445 | 1.272841 | 11.15256 | 4.2063 | 0.294244 | 4.037671 | 19.56446 | 12.7127 | 0.085323 | 0.330165 | 4.398245 | 0.26209956 | 0.07070085 |
| Scaled Cost Ratio | | 0.9595 | 0.927625 | 1.199651 | 1.130475 | 0.958943 | 1.012648 | 1.331043 | 15.94909 | 0.081948 | 0.394396 | 0.205867 | 0.11174132 | 0.26214461 |
| | | 0.973485 | 0.95234 | 1.125604 | 1.082978 | 0.973118 | 1.008203 | 1.204273 | 6.050319 | 0.196697 | 0.546206 | 0.357957 | 0.24062402 | 0.41884333 |

| Stream number | | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|
| Stream Identification Components | MW | Surplus TET lbs/hr | Vap Feed lbs/hr | Feed to Reactors lbs/hr | Silicon Product lbs/hr | Reactor Effluent lbs/hr | Recycle Gas lbs/hr | H2 Recycle lbs/hr | Losses lbs/hr | Make-up Hydrogen lbs/hr | Vent gas to HCl sys lbs/hr | Vent Reco Liquid lbs/hr | H2 Dryer Losses lbs/hr | Losses lbs/hr | Recycle HCl lbs/hr |
| Hydrogen | 2.016 | | | 207.365 | | 201.6 | 201.4875 | 196.3692 | 6.63 | 10.88337 | 6.571664 | | 3.63 | 1.43 | |
| Silicon | 28.06 | | | 0 | 76.0426 | 0 | | | | | | | | | |
| Hydrogen Chloride | 36.461 | | | 1.553239 | | 310.6477 | 309.0945 | | 3.31 | | 66.34 | | | 11.9 | 360.224481 |

TABLE 1b-continued

Improved Mass Balance based on FIG 4b

| Components | MW | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr |
|---|---|---|---|---|---|---|---|---|---|---|---|---|---|---|
| Dichlorosilane | 100.982 | | | | 16.96498 | 0.495377 | 0 | | | | 0 | 0 | | 0.4953773 |
| Trichlorosilane | 135.4 | | 471.538 | 16.4696 | 885.516 | 4.589629 | 1.59 | | | 1.59 | 46.04828 | | |  |
| Silicon Tetrachloride | 169.87 | 29.56253 | 54.90185 | 15.29684 | 2174.336 | 0.534908 | 0.01 | | | 0.01 | 1.69 | | 4.58962943 | 0.5349084 |
| Total | | 29.56253 | 526.4399 | 1591.407 | 76.0426 | 3589.065 | 516.2019 | 196.3692 | 11.54 | 10.88337 | 74.51166 | 47.73828 | 3.63 | 18.9499151 | 360.224481 |

| Components | MW | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr | lbmol/hr |
|---|---|---|---|---|---|---|---|---|---|---|---|---|---|---|
| Hydrogen | 2.016 | 0 | 0 | 102.8596 | 0 | 99.94419 | 97.40534 | 3.28869 | 5.398495 | 3.259754 | 0 | 1.80059524 | 0.7093254 | |
| Silicon | 28.06 | 0 | 0 | 0 | 2.71 | 0 | 0 | 0 | 0 | 0 | 0 | 0 | 0 | 0 |
| Hydrogen Chloride | 36.461 | 0 | 0 | 0.0426 | 0 | 8.52 | 0 | 0.090782 | 0 | 1.819478 | 0 | 0 | 0.32637613 | 0 |
| Dichlorosilane | 100.982 | 0 | 0 | 0.163094 | 0 | 0.168 | 0 | 0 | 0 | 0 | 0 | 0 | 0.0049056 | 0 |
| Trichlorosilane | 135.4 | 0 | 3.482556 | 9.975794 | 0 | 6.54 | 0 | 0.011743 | 0 | 0.011743 | 0.340091 | 0 | 0.03389682 | 9.87972029 |
| Silicon Tetrachloride | 169.87 | 0.17403 | 0.323199 | 0.09005 | 0 | 12.8 | 0 | 5.89E-05 | 0 | 5.89E-05 | 0.009949 | 0 | 0.00314893 | 0 |
| Total | | 0.17403 | 3.805755 | 113.1312 | 2.71 | 128.028 | 108.4635 | 97.40534 | 3.391274 | 5.398495 | 5.091034 | 0.350039 | 1.80059524 | 1.07765287 | 9.87972029 |
| Molal Flow Ratio | | 1.038375 | 0.227313 | 0.704438 | 1.092566 | 0.783472 | 0.729351 | 0.697631 | 0.991258 | 1.064909 | 0.988574 | 0.329406 | 1 | 0.98583555 | 1.24675347 |
| Scaled Cost Ratio | | 1.024779 | 0.381773 | 0.796339 | 1.059232 | 0.853327 | 0.814533 | 0.791328 | 0.994309 | 1.041725 | 0.992558 | 0.485876 | 1 | 0.99077014 | 1.15413705 |

TABLE 2

| | Heat Balance | Feed to Deposition Reactor | | | | |
|---|---|---|---|---|---|---|
| | Temper. C. | Amount kmol | Amount kg | Amount Nm3 | Latent H Mcal | Total H Mcal |

A: Hydrogen Provides All the Heat up to the 1100 C. peak Temperature

INPUT SPECIES Formula

| | | | | | | |
|---|---|---|---|---|---|---|
| PHASE 1: | 350.000 | | | | | |
| H2(g) * Heating Gas | 1620.000 | 102.779 | 207.182 | 2354.344 | 1211.09 | 1211.09 |
| HCl(g) | 350.000 | 0.043 | 1.564 | 0.978 | 0.10 | −0.85 |
| SiCl4(g) | 350.000 | 0.191 | 32.450 | 4.281 | 1.46 | −28.79 |
| SiHCl3(g) | 350.000 | 10.000 | 1354.524 | 224.136 | 72.63 | −1113.37 |
| SiH2Cl2(g) | 350.000 | 0.162 | 16.363 | 3.692 | 0.96 | −11.45 |
| OUTPUT SPECIES Formula | | | | | | |
| | | | | | | |
| PHASE 1: | 1100.000 | 120.740 | 1612.155 | 2699.030 | 1040.598 | 53.802 |
| H2(g) | 1100.000 | 102.000 | 205.612 | 2336.495 | 785.91 | 785.91 |
| HCl(g) | 1100.000 | 8.380 | 305.542 | 190.964 | 66.69 | −118.20 |
| SiCl2(g) | 1100.000 | 1.930 | 191.054 | 43.258 | 28.00 | −49.78 |
| SiCl3(g) | 1100.000 | 0.896 | 120.462 | 20.083 | 18.41 | −65.18 |
| SiCl4(g) | 1100.000 | 1.960 | 332.999 | 43.931 | 52.10 | −258.37 |
| SiHCl(g) | 1100.000 | 0.009 | 0.581 | 0.202 | 0.12 | 0.20 |
| SiHCl3(g) | 1100.000 | 2.660 | 360.303 | 59.620 | 67.44 | −248.03 |
| SiH2Cl2(g) | 1100.000 | 0.189 | 19.090 | 4.307 | 4.27 | −10.21 |
| SiH3Cl(g) | 1100.000 | 0.006 | 0.399 | 0.137 | 0.12 | −0.08 |
| Si(Solid Deposited) | 1100.000 | 2.710 | 76.112 | 0.033 | 17.53 | 17.53 |
| | | kmol | kg | Nm3 | Mcal | Mcal |
| BALANCE: | | 7.565 | 0.071 | 111.598 | −245.64 | −2.83 |
| Temperature of Products = | | 1102.734° C. | | When Heat Balance = 0 | | |

B: Hydrogen Provides All the Heat up to the 845 C. Initial Temperature, remaining heat by Rx Heaters INPUT SPECIES Formula

| | | | | | | |
|---|---|---|---|---|---|---|
| PHASE 1: | 350.000 | | | | | |
| H2(g) *Heating gas | 1300.000 | 102.779 | 207.182 | 2354.344 | 950.34 | 950.34 |
| HCl(g) | 350.000 | 0.043 | 1.564 | 0.978 | 0.10 | −0.85 |
| SiCl4(g) | 350.000 | 0.191 | 32.450 | 4.281 | 1.46 | −28.79 |
| SiHCl3(g) | 350.000 | 10.000 | 1354.524 | 224.136 | 72.63 | −1113.37 |
| SiH2Cl2(g) | 350.000 | 0.162 | 16.363 | 3.692 | 0.96 | −11.45 |
| OUTPUT SPECIES Formula | | | | | | |
| | | | | | | |
| PHASE 1: | 1100.000 | 120.740 | 1612.155 | 2699.030 | 1040.598 | 53.802 |
| H2(g) | 1100.000 | 102.000 | 205.612 | 2336.495 | 785.91 | 785.91 |
| HCl(g) | 1100.000 | 8.380 | 305.542 | 190.964 | 66.69 | −118.20 |
| SiCl2(g) | 1100.000 | 1.930 | 191.054 | 43.258 | 28.00 | −49.78 |
| SiCl3(g) | 1100.000 | 0.896 | 120.462 | 20.083 | 18.41 | −65.18 |
| SiCl4(g) | 1100.000 | 1.960 | 332.999 | 43.931 | 52.10 | −258.37 |
| SiHCl(g) | 1100.000 | 0.009 | 0.581 | 0.202 | 0.12 | 0.20 |
| SiHCl3(g) | 1100.000 | 2.660 | 360.303 | 59.620 | 67.44 | −248.03 |
| SiH2Cl2(g) | 1100.000 | 0.189 | 19.090 | 4.307 | 4.27 | −10.21 |
| SiH3Cl(g) | 1100.000 | 0.006 | 0.399 | 0.137 | 0.12 | −0.08 |
| Si(Solid Deposited) | 1100.000 | 2.710 | 76.112 | 0.033 | 17.53 | 17.53 |
| | | kmol | kg | Nm3 | Mcal | Mcal |
| BALANCE: | | 7.565 | 0.071 | 11.598 | 15.11 | 257.93 |
| Temperature of Products = | | 845.490° C. | | When Heat Balance = 0 | | |

Reactor heaters @ 50% efficient= 272.0 Kilowatts
For Flows In Table 1 Improved Mass Balance

TABLE 3

| | Heat Balance | Feedstock recovery | | SiCl4 Cooling gas | | |
|---|---|---|---|---|---|---|
| | Temper. C. | Amount kmol | Amount kg | Amount Nm3 | Latent H Mcal | Total H Mcal |

INPUT SPECIES Formula

| | | | | | | |
|---|---|---|---|---|---|---|
| PHASE 1: | 1100.000 | 130.734 | 3694.185 | 2983.739 | 1044.093 | −1954.703 |
| H2(g) | 1100.000 | 102.000 | 205.612 | 2336.495 | 785.91 | 785.91 |
| HCl(g) | 1100.000 | 8.380 | 305.542 | 190.964 | 66.69 | −118.20 |
| SiCl2(g) | 1100.000 | 1.930 | 191.054 | 43.258 | 28.00 | −49.78 |
| SiCl3(g) | 1100.000 | 0.896 | 120.462 | 20.083 | 18.41 | −65.18 |
| SiCl4(g) | 1100.000 | 1.960 | 332.999 | 43.931 | 52.10 | −258.37 |
| SiCl4(g) * Cooling gas | 100.000 | 12.700 | 2157.698 | 284.653 | 21.24 | −1990.44 |

TABLE 3-continued

| | Heat Balance | Feedstock recovery | | SiCl4 Cooling gas | | |
|---|---|---|---|---|---|---|
| SiHCl(g) | 1100.000 | 0.009 | 0.604 | 0.210 | 0.12 | 0.21 |
| SiHCl3(g) * Cooling gas | 100.000 | 0.013 | 1.720 | 0.285 | 0.02 | −1.49 |
| SiH2Cl2(g) | 1100.000 | 0.189 | 19.090 | 4.307 | 4.27 | −10.21 |
| SiH3Cl(g) | 1100.000 | 0.006 | 0.426 | 0.146 | 0.13 | −0.08 |
| OUTPUT SPECIES Formula | | | | | | |
| PHASE 1: | 912.500 | 128.878 | 3694.890 | 2941.200 | 1115.013 | −1954.713 |
| H2(g) | 912.500 | 100.000 | 201.580 | 2290.682 | 629.20 | 629.20 |
| HCl(g) | 912.500 | 8.520 | 310.647 | 194.154 | 55.28 | −132.70 |
| SiCl2(g) | 912.500 | 0.254 | 25.144 | 5.693 | 3.03 | −7.21 |
| SiCl3(g) | 912.500 | 0.594 | 79.860 | 13.314 | 10.02 | −45.40 |
| SiCl4(g) | 912.500 | 12.800 | 2174.688 | 286.894 | 278.94 | −1748.58 |
| SiHCl3(g) | 912.500 | 6.540 | 885.859 | 146.585 | 135.45 | −640.19 |
| SiH2Cl2(g) | 912.500 | 0.168 | 16.969 | 3.829 | 3.06 | −9.81 |
| SiH3Cl(g) | 912.500 | 0.002 | 0.125 | 0.043 | 0.03 | −0.03 |
| | | kmol | kg | Nm3 | Mcal | Mcal |
| BALANCE: | | −1.856 | 0.705 | −42.539 | 70.920 | −0.010 |

| MATERIAL BALANCE ELEMENT | Input kmol | Output kmol | Balance kmol | Input kg | Output kg | Balance kg |
|---|---|---|---|---|---|---|
| Cl | 81.950 | 81.968 | 0.018 | 2905.368 | 2906.017 | 0.648 |
| H | 215.451 | 215.402 | −0.049 | 217.53 | 217.104 | −0.050 |
| Si | 20.354 | 20.358 | 0.004 | 571.663 | 571.769 | 0.106 |

What is claimed is:

1. A method for improving the efficiency of a silicon purification process comprising:

providing a silicon deposition reactor;

feeding a first source gas containing one or more hydrohalosilanes into the silicon deposition reactor;

producing a deposit of silicon and a first effluent gas having less hydrohalosilanes than the first source gas;

feeding said first effluent gas to a recovery reactor;

controlling the first effluent gas temperature to a range of 800–1100° C.;

causing a change in composition to a second effluent gas containing more hydrohalosilanes than the first effluent gas; and rapidly quenching the second effluent gas to a temperature of less than 400° C. to essentially maintain the hydrohalosilanes.

2. The method of claim 1 wherein a second source gas is fed into the silicon deposition reactor, said second source gas being selected from the group consisting of silicon tetrachloride, silicon tetrabromide, and silicon tetraiodide, and said second source gas being added to the first effluent gas at a temperature sufficient to reduce the energy required to control the effluent temperature and to increase the hydrohalosilane content in the second effluent gas.

3. The method of claim 1 further comprising feeding hydrogen to the silicon deposition reactor at a temperature of 400–800° C., the hydrogen being added to the silicon deposition reactor through a separate inlet.

4. The method of claim 3 wherein a third source gas is fed into the silicon deposition reactor, said third source gas being selected from the group consisting of silicon tetrachloride, silicon tetrabromide, and silicon tetraiodide at a temperature of 400–1800° C., said third source gas being added to the silicon deposition reactor through a separate inlet.

5. The method of claim 3 wherein the silicon deposition reactor is a fluidized bed, the first source gas being derived in part from recovery of hydrohalosilanes from the second effluent gas, and each source gas being introduced separately into the silicon deposition reactor through independent gas distribution means.

6. The method of claim 1 wherein the hydrohalosilanes are selected from the group consisting of monochlorosilane, dichlorosilane, trichlorosilane, monbromosilane, dibromosilane, tribromosilane, monoiodosilane, diiodosilane, and triiodosilane.

7. The method of claim 1 wherein a recovery means is provided to further process the second effluent gas, after quenching, to provide a second source gas selected from the group consisting of silicon tetrachloride, silicon tetrabromide, and silicon tetraiodide, said second source gas being added to the first effluent gas at a temperature sufficient to reduce the energy required to control the effluent temperature and to increase the hydrohalosilane content in the second effluent gas.

8. The method of claim 7 wherein the recovery means is a dedicated high purity system that is isolated from impurities.

9. The method of claim 7 or claim 8 wherein the recovery means is also used to recover hydrohalosilanes for use as part of the first source gas.

10. The method of claim 1 wherein the silicon deposition reactor and recovery reactor are provided as separate chambers, said chambers being linked by a passage.

11. The method of claim 10 wherein a second source gas is provided which is a silicon tetrahalide selected from the group consisting of silicon tetrachloride, silicon tetrabromide and silicon tetraiodide, the second source gas being added to the first effluent gas at a temperature selected to reduce the energy required to control the first effluent temperature and to increase the hydrohalosilane content in the second effluent gas.

* * * * *

UNITED STATES PATENT AND TRADEMARK OFFICE
CERTIFICATE OF CORRECTION

PATENT NO. : 6,368,568 B1
DATED : April 9, 2002
INVENTOR(S) : Stephen M. Lord

It is certified that error appears in the above-identified patent and that said Letters Patent is hereby corrected as shown below:

<u>Column 23,</u>
Lines 52 through 62,

Claims 3 and 4 should read as follows:

3. The method of claim 1 further comprising feeding hydrogen to the silicon deposition reactor at a temperature of 400-1800 °C the hydrogen being added to the silicon deposition reactor through a separate inlet.

4. The method of claim 1 where the hydrohalosilanes are selected from the group consisting of, monochlorosilane, dichlorosilane, trichlorosilane, monobromosilane, dibromosilane, tribromosilane, monoiodosilane, diiodosilane and triiodosilane.

Signed and Sealed this

Third Day of December, 2002

JAMES E. ROGAN
*Director of the United States Patent and Trademark Office*